Feb. 27, 1951 W. A. WILLIAMS 2,543,482
REVERSE ROTATION CHECK MEANS
Filed Aug. 7, 1947 3 Sheets-Sheet 1

WITNESSES
Thomas W. Kerr, Jr.
A. J. Brittingham

INVENTOR:
William A. Williams,
BY Paul & Paul
ATTORNEYS.

Feb. 27, 1951 W. A. WILLIAMS 2,543,482
REVERSE ROTATION CHECK MEANS
Filed Aug. 7, 1947 3 Sheets-Sheet 2

WITNESSES
Thomas W. Kerr, Jr.
A. J. Brittingham

INVENTOR:
William A. Williams,
BY Paul & Paul
ATTORNEYS.

Feb. 27, 1951     W. A. WILLIAMS     2,543,482
REVERSE ROTATION CHECK MEANS

Filed Aug. 7, 1947     3 Sheets-Sheet 2

WITNESSES
Thomas W. Kerr, Jr.
A. J. Brittingham

INVENTOR:
William A. Williams,
BY Paul & Paul
ATTORNEYS.

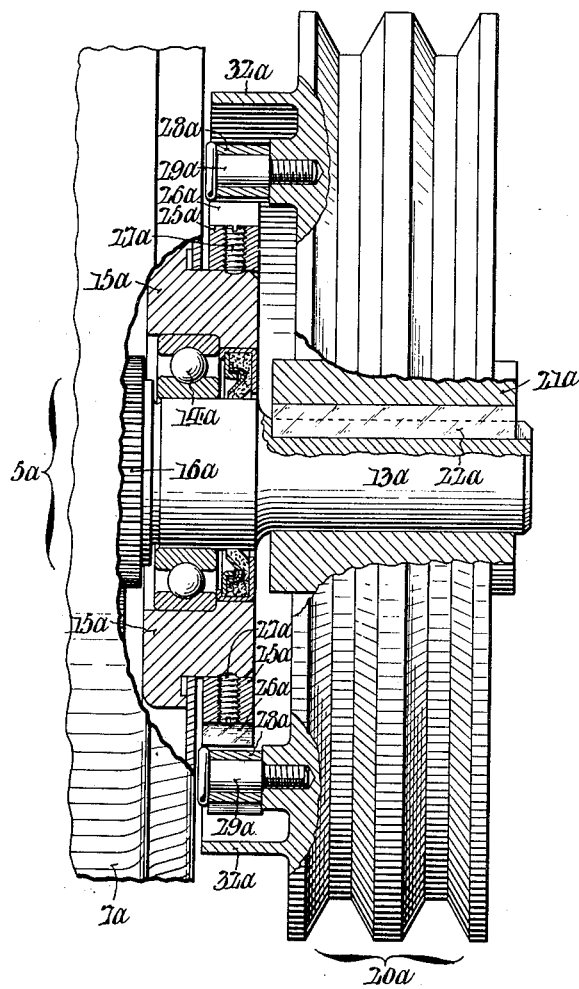

Patented Feb. 27, 1951

2,543,482

UNITED STATES PATENT OFFICE 2,543,482

REVERSE ROTATION CHECK MEANS

William A. Williams, Philadelphia, Pa., assignor to The American Pulley Company, Philadelphia, Pa., a corporation of Pennsylvania Application August 7, 1947, Serial No. 767,243

2 Claims. (Cl. 192—4)

This invention relates to reverse rotation check means intended more especially for incorporation in speed reduction drive units of a type arranged to be hung from the shaft of the machine and powered by belting from an electric motor or other prime mover. Speed reduction drive units of the kind referred to have output and in-put shafts which protrude through the wall of an oil tight housing containing the speed-reducing gearing by which the two shafts are connected, the out-put shaft being usually the hub of one of the gears and arranged for direct connection to the shaft of the machine which is to be driven, and the in-put shaft being provided with a pulley whereto the power is applied by the belt from the motor. As ordinarily constructed, such speed reduction units are incapable of preventing reverse rotation of the machine shafts and possible injury to the machines by reason of such reverse rotation, upon shutting off of the power.

The chief aim of my invention is to obviate contingencies of the above sort. This objective is realized in practice as hereinafter more fully set forth, through provision of a simple reverse rotation check means which is easily incorporated in speed reduction drive units of the species aforementioned without entailing any radical changes in their usual construction or interfering with their normal mode of operation; which lends itself to ready production at small cost; and which reliably functions automatically by imposition of restraint upon one of the shafts of the units immediately upon stoppage, to hold the shaft of the driven machine against rotation in the wrong direction.

Figure 1:
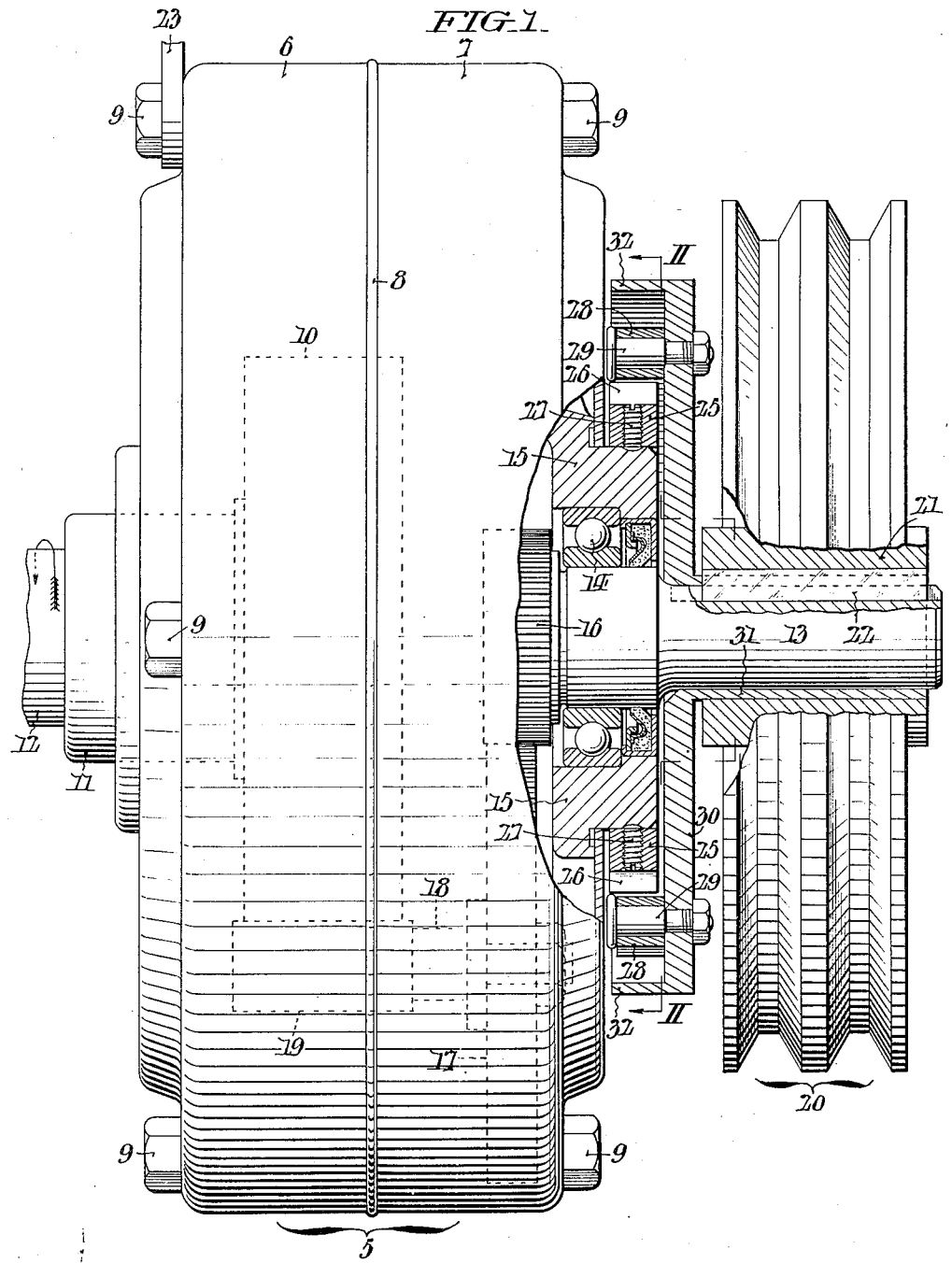

Other important objects and attendant advantages will appear from the following detailed description of the attached drawings; wherein Fig. 1 is a view, partly in elevation and partly in section, of a speed reducing transmision unit conveniently embodying my invention.

Figure 2:
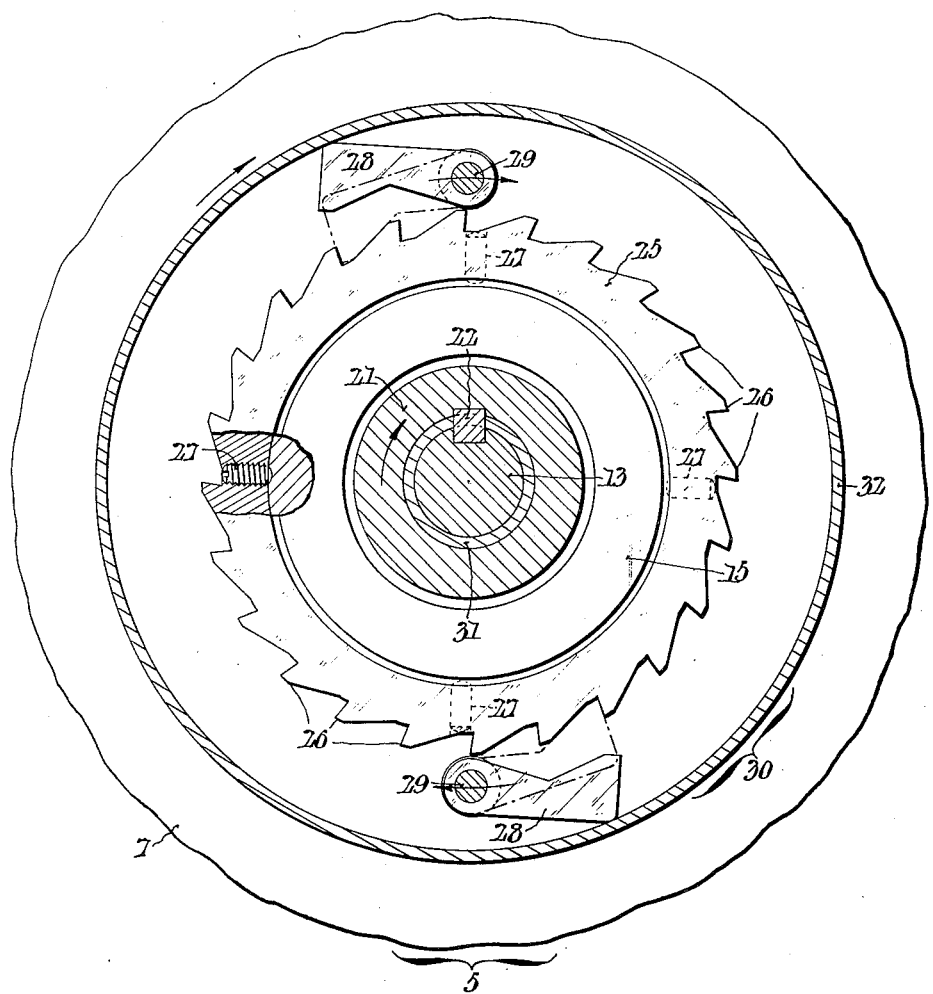
Figure 2:
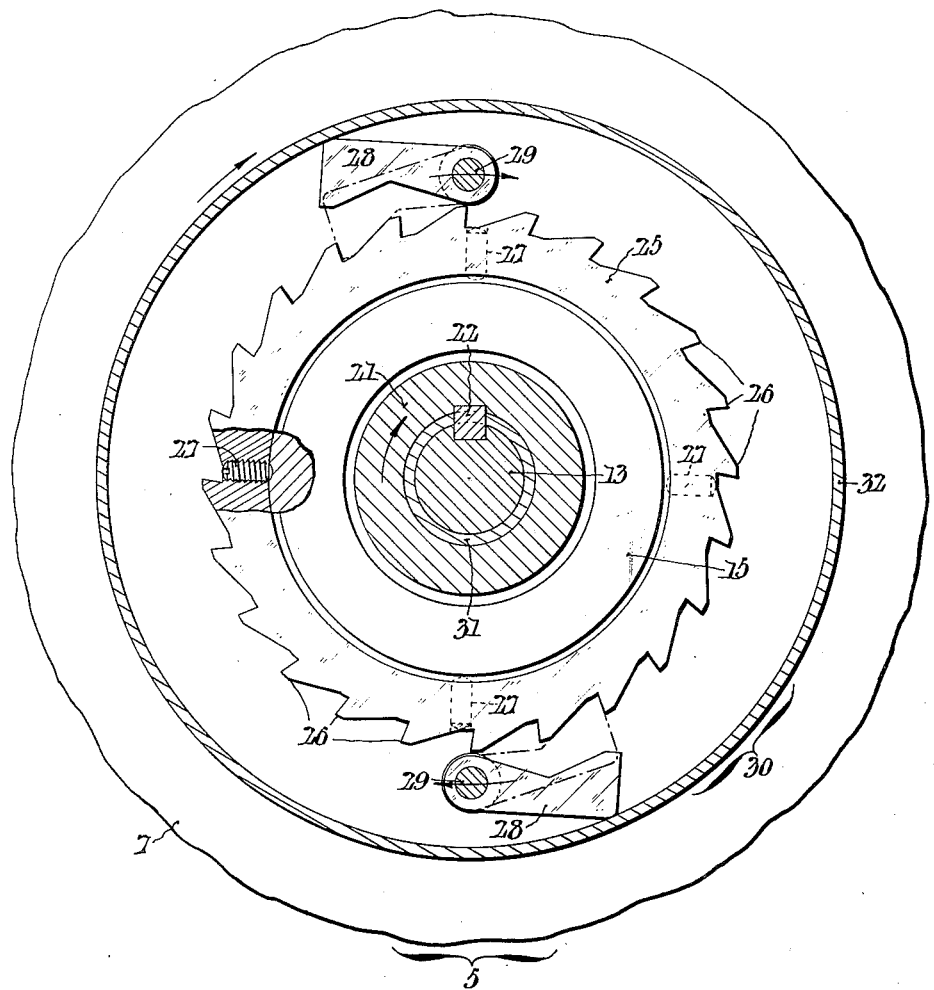

Fig. 2 is a fragmentary view in section taken as indicated by the angled arrows II—II in Fig. 1; and Fig. 3 is a view like Fig. 1 showing an alternative embodiment of my invention.

With reference first more particularly to Figs. 1 and 2, the speed reduction unit therein illustrated for convenience of exemplifying my invention, is generally of a well known commercial type having an annular housing 5 with opposingly-arranged hollow side wall components 6 and 7 which meet in a medial plane 8, and which are rigidly secured together by a plurality of screw bolts indicated at 9. Suitably journalled axially within the housing 5 is a relatively large spur gear 10 whereof the hub 11 which constitutes the out-put shaft of the unit, protrudes through the side of the component 6 for connection to the main shaft 12 of the apparatus or machine to be driven. The in-put shaft 13 of the unit extends axially through the side of the component 7, and is rotatively supported by an anti-friction bearing 14 set into a boss 15 of said component. A spur pinion 16 at the inner end of the shaft 13 transmits motion to a spur gear 17 on a counter shaft 18 also suitably journalled in the housing 5, the movement of the latter shaft being in turn communicated, through a spur pinion 19 thereon, to the gear wheel 10. Power from a prime mover such as an electric motor is applied by belts (not shown) to a multi-groove sheave 20 whereof the hub 21 is secured to the protruding end of the in-put shaft 13 by a spline or key 22. The housing 5 is restrained against rotation about the hub 11 of gear wheel 10 by a strap bar partly shown at 23 which, at one end, is secured to one of the screw bolts 9, and whereof the other end is adapted to be made fast to a fixed anchorage (not shown) which may be on the driven machine or on the floor beside it.

The reverse rotation check means, with which my invention is more particularly concerned, includes a ring 25 with ratchet teeth 26 which is mounted over the bearing boss 15 of housing component 7 and removably secured thereto by circumferentially spaced set screws 27. Arranged to cooperate with the ratchet teeth 26 of the ring 25 under certain conditions as later explained, are two detents 28 which are freely pivoted on shouldered studs 29 projecting from an element affixed to the in-put shaft 13, said element having, in the present instance, the form of a disk or spider 30 with a hub 31 which fits within the hub 21 of sheave 20, and which is secured to said shaft with the sheave by the spline or key 22. As shown, the disk or spider 30 is provided with a peripheral flange 32 that serves to limit the outward swing of the pawls 28.

Assuming that the shaft 12 of the apparatus or machine must be driven clockwise or in the direction of the arrow in Fig. 1, the arrangement of the several gears of the unit require that power to the in-put shaft 13 be applied in the same direction. Under these circumstances, the detents 28 on the rotating disk or spider 30 will fall away from the stationary ratchet-toothed ring 25 under the influence of centrifugal force, and normally lie inactive against the circumferential flange 32 of said disk or spider. Upon stoppage, the detents 28 will fall inward into engagement with the teeth 26 of the stationary ratchet ring 25 as indicated in dot and dash lines in Fig. 2 and so check reverse rotation of the shaft 12 of the apparatus or machine if it should have a tendency to do so of its own accord. My invention thus serves as a safety means to prevent injury or damage to the apparatus or machine such as might result when its shaft 12 turns or is turned reversely.

For use of the transmission unit with an apparatus or machine whereof the shaft must be rotated anti-clockwise, the check means of my invention can be made to serve in its protective capacity simply by removing the ring 25 and the detents 28, reversing them as to position, and finally reassembling them in the unit in a manner which will be readily understood from Fig. 2.

In the embodiment illustrated in Fig. 3 the sheave 20a is utilized as the carrier element for the detents 28a and provided with an annular flange 32a to limit the outward swing of said detents. In all other respects the construction here is identical with that of the embodiment shown in Figs. 1 and 2. Accordingly, all the other elements shown in Fig. 3 not specifically referred to but having their counterparts in the first described embodiment, are identified by the same reference numerals previously employed with addition in each instance of the letter "a" for convenience of more ready distinction.

Having thus described my invention, I claim:

1. A reverse rotation check means for use with a speed reduction unit having a gear-enclosing casing, an output shaft projecting through one side of the casing for direct connection to the shaft of a machine to be driven, and a power input shaft extending through a bearing boss at the opposite side of the casing and having a drive pulley mounted thereon, said reverse check means comprising a ratchet ring secured in position, with capacity for reversal, upon the bearing boss of the gear-enclosing casing; a freely-pivoted detent mounted in fixed relation to the pulley and adapted to react with the teeth of the ratchet ring in preventing reverse rotation; and an annular guard concentric with the pulley against which the detent is held by centrifugal force out of engagement with the ratchet ring during normal operation of the unit.

2. A reverse rotation check means for use with a speed reduction unit having a gear-enclosing casing, an output shaft projecting through one side of the casing for direct connection to the shaft of a machine to be driven, and a power input shaft extending through a bearing boss at the opposite side of the casing and having a drive pulley mounted thereon, said reverse check means comprising a ratchet ring secured in position, with capacity for reversal, upon the bearing boss of the gear-enclosing casing; a disk having a hub coaxially within the hub of the drive pulley and fixed with the latter on the power input shaft of the speed reduction unit; a detent freely pivoted on the disk and adapted to react with the teeth of the ratchet ring in preventing reverse rotation; and a peripheral guard flange on the disk against which the detent is held by centrifugal force out of engagement with the ratchet ring during normal operation of the unit.

WILLIAM A. WILLIAMS.

REFERENCES CITED

The following references are of record in the file of this patent:

UNITED STATES PATENTS

| Number | Name | Date |
|---|---|---|
| 1,216,416 | Chalmers | Feb. 20, 1917 |
| 1,383,201 | Gormley | June 28, 1921 |
| 1,846,259 | Johnston | Feb. 23, 1932 |
| 1,954,493 | Rothgorn | Apr. 10, 1934 |
| 2,001,810 | Zwald | May 21, 1935 |
| 2,002,857 | Jameson | May 28, 1935 |
| 2,135,897 | Jameson | Nov. 8, 1938 |
| 2,181,271 | Graves | Nov. 28, 1939 |

FOREIGN PATENTS

| Number | Country | Date |
|---|---|---|
| 102,921 | Switzerland | Jan. 2, 1924 |